W. T. LINGO.
WORK HOLDING MECHANISM FOR LATHES AND THE LIKE.
APPLICATION FILED MAR. 10, 1916.
1,252,274. Patented Jan. 1, 1918.
2 SHEETS—SHEET 1.
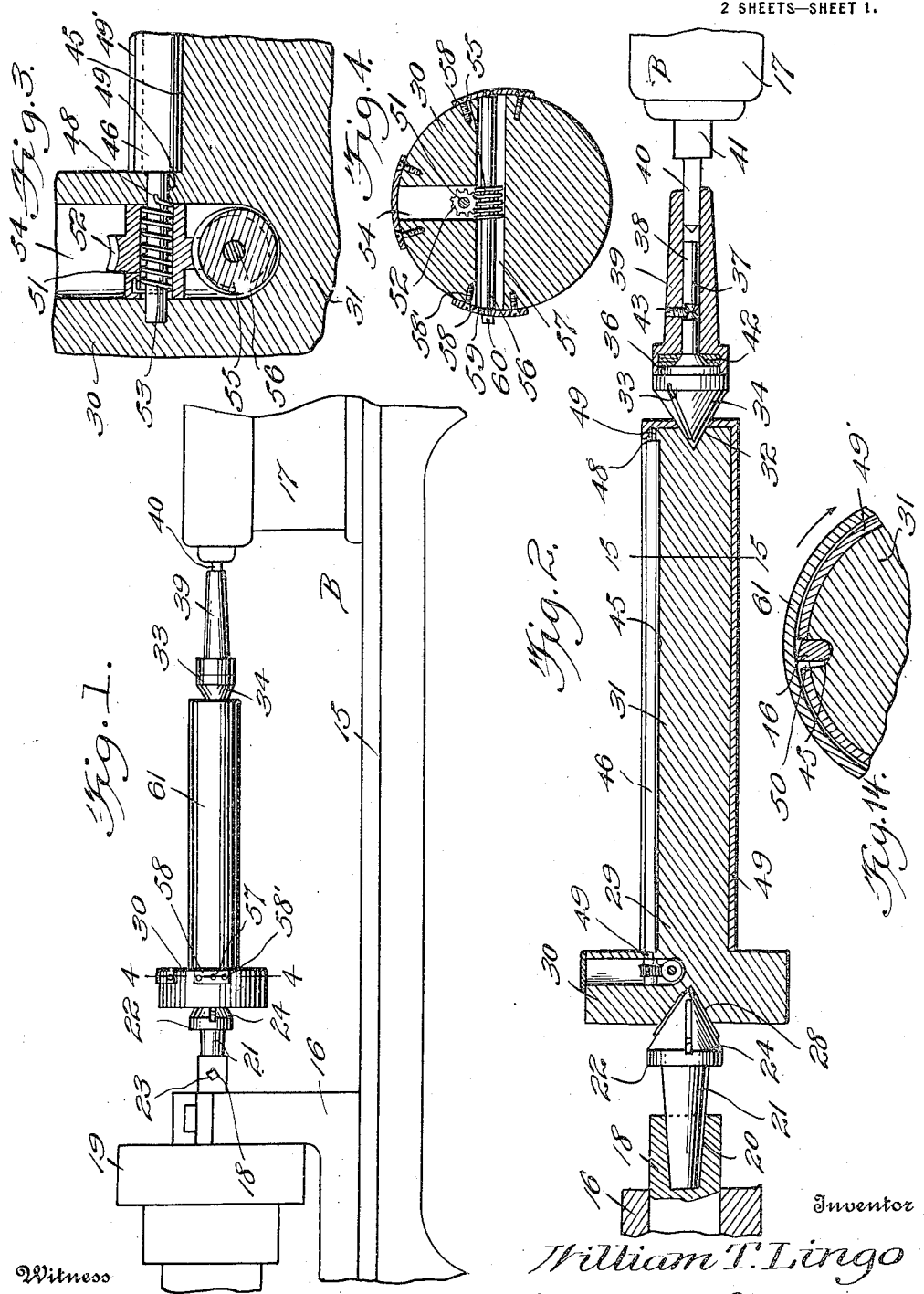
Witness
W. S. McDowell
Inventor
William T. Lingo
By Victor J. Evans
Attorney

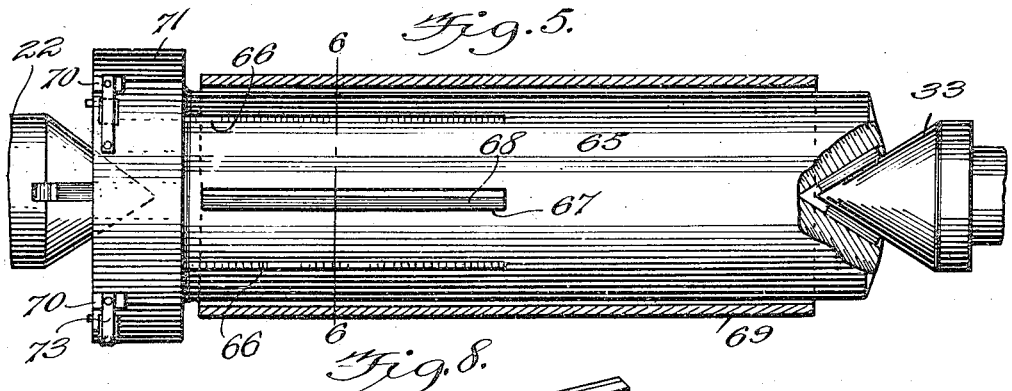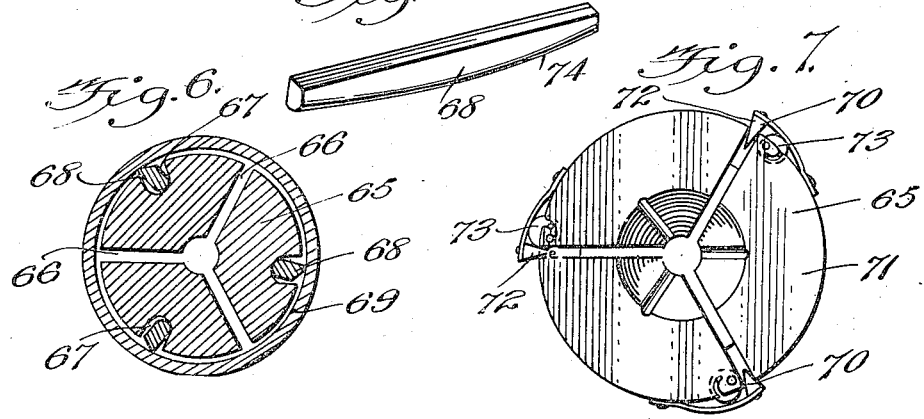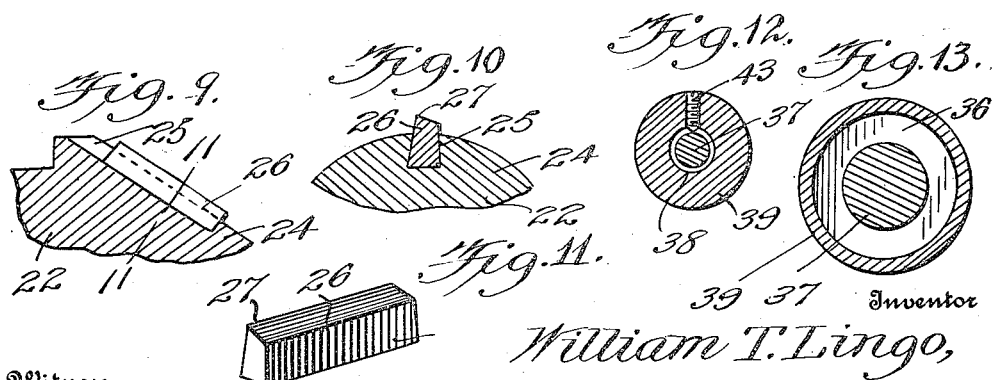

UNITED STATES PATENT OFFICE.

WILLIAM T. LINGO, OF PHILADELPHIA, PENNSYLVANIA.

WORK-HOLDING MECHANISM FOR LATHES AND THE LIKE.

1,252,274. Specification of Letters Patent. Patented Jan. 1, 1918.

Application filed March 10, 1916. Serial No. 83,416.

*To all whom it may concern:*

Be it known that I, WILLIAM T. LINGO, a citizen of the United States, residing at Philadelphia, in the county of Philadelphia and State of Pennsylvania, have invented new and useful Improvements in Work-Holding Mechanism for Lathes and the like, of which the following is a specification.

This invention relates to lathes mechanism, and has particular reference to improved forms of mandrels and other work supporting devices.

An object of the invention is to provide a lathe with a mandrel which is rotatably supported at its opposite longitudinal extremities and, is further formed, in a novel manner, so that the same is capable of being readily associated or disassociated with the driving mechanism of the lathe.

Another object resides in providing a mandrel with automatically operating gripping members which are adapted to engage the material to be worked on in a firm and rigid manner, so that said material will revolve in unison with the mandrel and will be prevented from slipping when applied thereto.

A further object is to provide a mandrel with adjustable mechanism for receiving work of varying sizes or diameters.

A still further object is the provision of mandrel for receiving bushing sleeves and the like, in order that the outer faces of the work may be machined or otherwise finished, means being provided for rigidly securing the work to the mandrel and for centering the same thereon so that the work may be quickly and accurately finished.

Other objects reside in a mandrel formed with mechanism for adjusting the work gripping elements thereof in a positive manner so as to insure the rotation of the work in unison with the mandred.

The invention further consists in improving and in enlarging the utility of the mechanism disclosed in my patent number 1,192,437, granted July 25, 1916.

In the further disclosure of the invention reference is to be had to the accompanying drawings, in which similar characters of reference denote corresponding parts in all the views, and in which:—

Figure 1 is a fragmentary side elevation of a lathe illustrating the preferred form of mechanism, comprising the present invention, applied thereto, Fig. 2 is a vertical longitudinal sectional view of the same, Fig. 3 is an enlarged detail vertical sectional view illustrating the adjusting mechanism for the work gripping elements, Fig. 4 is a transverse sectional view in the line 4—4 of Fig. 1, Fig. 5 is a side elevation, parts being shown in section, of a slightly modified form of mandrel, Fig. 6 is a transverse sectional view taken on the line 6—6 of Fig. 5, Fig. 7 is an end elevation thereof, Fig. 8 is a detail perspective view of one of the work gripping elements utilized in the form of the invention shown in Fig. 5, Fig. 9 is a detail sectional view of one of the mandrel supporting heads, showing the removable lug members positioned therein, Fig. 10 is a fragmentary section taken through the head stock center, Fig. 11 is a perspective view of one of the removable lugs, Fig. 12 is a transverse section through the tail stock center.

Fig. 13 is a similar view on a different line,

Fig. 14 is an enlarged sectional view on the line 15—15 of Fig. 2.

Referring more particularly to the drawings, the invention is shown applied to the ordinary form of lathe B, comprising the usual bed 15, headstock 16, and movable tail-stock 17; the head stock 16 having rotatably mounted therein the usual live spindle 18, which is operated by the stepped pulleys 19 of conventional formation.

The free extremity of the live spindle 18 is provided with an inwardly tapered opening 20 for the reception of a similarly formed shank 21 of a mandrel supporting head 22, the latter being driven into the opening 20 so that the head will revolve in conjunction with the live spindle. A set screw 23 may be used to insure this feature. The member 22 comprises a conical head 24, integrally formed with the tapered shank 21, and in which is generally formed an odd number of dove-tail seats 25, extending from the enlarged portion of the head to a point adjacent the extremity thereof. Securedly positioned in the seats 25 are mandrel engaging lugs 26, formed with beveled faces 27 so as to provide relatively sharp edges for the purpose of securing a positive grip upon the walls of a conical socket 28 formed in a mandrel 29.

The mandrel 29 consists of an enlarged head 30 and an elongated circular body 31, integrally formed with the head. The end of the mandrel 29 opposite the socket 28 is also provided with a conical shaped socket 32 and which is adapted to receive a chuck supporting head 33 of a design similar to the head 22. The head 33 consists of a conical face 34 which is inserted into the socket 32 and said face is preferably provided with gripping lugs 35 of the same construction as the lugs 26. The other end of the head 33 is provided with an annular shoulder 36 and an elongated shank 37, the latter being received within a bore 38 formed in a stationary sleeve 39. The bore 38 is of sufficient length to receive the shank 37 and also to accommodate the supporting dead center 40 of a tail-stock spindle 41, movable longitudinally of the bed 15 of the lathe B. The sleeve 39 is wedged upon the center 40 so as to be rigidly supported thereby.

From the foregoing it will be evident that the mandrel 29 will be revolved through the agency of the live spindle 18 and coöperating head 22, this rotary movement being imparted to the head 33 and causing the latter to revolve in unison with the mandrel. This feature, that is, a mandrel being supported between two rotatable centers, forms one of the salient features of the present invention, as it permits the mandrel to revolve smoothly and evenly on a true center thereby permitting the work, supported by the mandrel, to be accurately and quickly accomplished to a degree unattainable by a mandrel having but a single revolving center.

The mandrel is capable of being quickly and conveniently placed in operation and is accomplished by placing the same upon the head 22, when the latter is idle, the tail stock is then moved forwardly until the head 33 is tightly wedged into the socket 32. This action results in establishing a firm frictional contact between the head member 22 and the socket 28 and thereby rendering the device fit for operation. Anti-friction washers 42 are positioned between the head 33 and the stationary sleeve 39 in order to eliminate friction or wear at this point of connection. A retaining screw 43 is threaded into the sleeve 39 and prevents the head 33 from becoming accidentally disengaged from the sleeve, the screw 43, however, does not interfere with the rotation of the head member 33.

The mandrel above described is particularly adapted to support bushings, sleeves and the like, although its usefulness is not limited to this particular class of work, and work gripping mechanism is formed with the mandrel to engage in an effective manner to cause the same to revolve in synchronism with the mandrel and to prevent the same from slipping when being operated on, by the usual finishing tools.

To this end, the mandrel is formed with a longitudinal extending seat 45 opening into the outer periphery of the body thereof and in which is movably positioned a rocking clutch bar 46, provided on its outer edge with a beveled face 47. The ends of the bar are provided with trunnion extensions 48 and are journaled in openings 49, formed in the body of the chuck, so that the bar will be permitted to partially revolve and to retain the same within the slot 45. A mandrel enlarging sleeve 49 encircles the body of the mandrel and has a slot 50 formed therein which is positioned in alinement with the seat 45, and the outer beveled edge or face 47 of the bar 46 is normally positioned within the slots 50 but the outermost edge of said beveled face normally terminates at a point below the outer periphery of the sleeve 49', for a purpose to be presently set forth. The sleeve 49' is one of a plurality of similarly shaped members, but said members vary with respect to their extreme diameters, this construction being necessary to accommodate work having varying internal diameters.

One of the trunnions 48, which terminates within the enlarged head 30 of the mandrel, extends within a bore 51 of a worm gear 52, and encircling the trunnion is a helical spring 53 having one of its terminals secured to said trunnion while the opposite extremity thereof is connected with the gear 52. The gear 52 is located within a bore 54 formed in the head of the mandrel and is adapted to mesh with a similar gear or screw 55 rotatably connected with an operating shaft 56 the latter extending at right angles to the trunnion 48 and being situated in a transverse bore 57. Side cleats 58 cover the bore 57 and are secured to the enlarged head 30 by means of fastening elements 58', said cleats being provided with openings, alining with the bore 57, and acting as bearings for the reduced ends 59 of the shaft 56. The outer extremities of the said shaft 56 are provided with tool receiving slots 60 in order that said shaft and coöperating gear 55 may be rotated.

In operation, a sleeve or bushing 61, or other material to be worked on, is positioned upon the sleeve 49 surrounding the mandrel 29. The mandrel is then applied to the conical head member 24 and the corresponding head member 33 on the movable head stock is brought into coöperation with the socket 32, thereby effectively supporting the mandrel and associated members in an operative position. In order to lock the bushing or other work 61 to the mandrel so that the bushing will revolve in unison therewith, the shaft 56 is rotated, which results in rocking the bar 46 upon its axis through the agency of the worm gears 52 and 55, and thereby bringing the acute angled edge of the bar 46 into firm frictional contact with the inner periphery of the bushing 61, thus insuring the rotation of the bushing in synchronism with the mandrel. By this construction the outer periphery of the bushing may be tooled or finished and also the faces of the ends thereof. A bushing having a tapered bore may be used in conjunction with the mandrel by forming the sleeve 49 with a corresponding taper to fit said bore, as will be obvious.

In the modified form illustrated in Figs. 5 to 8, a mandrel 65 is supported, as in the preferred form, upon the rotatable centering heads 24 and 33, the construction of which, having been previously described, will be omitted at this point. The mandrel 65, in this instance, is formed with radially extending slots 66 extending approximately one half of the length of the body thereof, and with intermediate bar receiving slots 67 adapted to receive work engaging clutch bars 68.

In operation, a bushing 69 is positioned upon the mandrel and the latter is then applied to the conical heads of the members 24 and 33. The action of the heads upon the mandrel will cause the latter to expand, which is permitted by the forming of the slots 66 therein, and this spreading movement forces the work engaging bars 68 into frictional contact with the bushing 69 with sufficient pressure to lock said bushing to the mandrel so that the former will revolve in unison with the latter. The mandrel is maintained in its expanded position by the action of spring pressed wedge members 70, positioned on the enlarged head 71 of the mandrel and having the beveled edges 72 entering the slots 66. When the bushing is desired to be released, the wedge members 70 are lifted out of the slots 66 by eccentric members 73 so that the mandrel will be free to contract and thereby draw the bars 68 away from the bushing 69, so that the latter may be removed from the mandrel. It will be noted that the inner edges of the bars 68 are rounded longitudinally, as at 74, in order to permit the bars to engage with work having a tapered bore.

In the modified form illustrated in Fig. 9 a bushing 75 is held between the supporting heads 24 and 33, the rotation of the bushing being governed in the same manner as that of the mandrel previously described. The usual mandrel is dispensed with in this form due to the fact that the bushing is smaller in diameter than the bushings 61 and 69, and can be readily received upon the rotatable heads 24 and 33.

The head members 24 and 33 may be provided with the lugs 26 or the latter may be dispensed with if their utility is found to be unessential, as will be the case in certain instances. However, the lugs have been found to be extremely important when being used in conjunction with the mandrels above described.

The mandrel is positive and efficient in operation, of comparatively simple design and not liable to become out of order. The mandrel has been found to be of great value in machine shops as it permits work to be quickly placed in position and removed therefrom with rapidity hitherto impossible with the present forms of mandrels.

Having described the invention what is claimed as new, is,

1. A work holding mandrel, comprising a body having a longitudinal seat in the peripheral face thereof, a work gripping clutch bar extending lengthwise of said seat and adapted to rock therein to engage and release the work, means for imparting a rocking movement to said clutch bar comprising a shaft extending at a right angle to the longitudinal axis of the mandrel, and a gear actuated by said shaft and resiliently connected with said clutch bar.

2. A work holding mandrel for lathes, comprising a cylindrical body having centering sockets in the ends thereof, said mandrel body having a longitudinal seat in the peripheral face thereof formed with a rounded bottom, a work gripping clutch bar extending lengthwise of said seat and having a rounded inner edge and a beveled gripping edge, said clutch bar being adapted to rock in said seat to engage and release the work, means for imparting a positive rocking movement to said clutch bar, the last named means comprising a countershaft extending at a right angle to the longitudinal axis of the mandrel, and a gear actuated by said countershaft and connected with said clutch bar, said gear being resiliently connected with said clutch bar.

3. A work holding mandrel for lathes, comprising a cylindrical body having centering sockets in the ends thereof, said mandrel having a longitudinal seat in the peripheral face thereof formed with a rounded bottom, a work gripping clutch bar extending lengthwise of said seat and having a rounded inner edge and a beveled gripping edge, said clutch bar being adapted to rock in said seat to engage and release the work, and a mandrel enlarging sleeve removably placed around said mandrel body and formed with a slot for said clutch bar.

4. A work holding mandrel for lathes, comprising a cylindrical body having centering sockets in the ends thereof, said mandrel body having a longitudinal seat in the peripheral face thereof formed with a rounded bottom, and a work gripping clutch bar extending lengthwise of said seat and having a beveled gripping edge, said clutch bar being adapted to rock in said seat to engage and release the work and having its inner edge rounded both transversely and longitudinally.

In testimony whereof I affix my signature in presence of two witnesses.

WILLIAM T. LINGO.

Witnesses:
EMIL PIZZA,
JACOB BATES.

Copies of this patent may be obtained for five cents each, by addressing the "Commissioner of Patents, Washington, D. C."